US009139050B2

(12) United States Patent
Venkataramani et al.

(10) Patent No.: US 9,139,050 B2
(45) Date of Patent: Sep. 22, 2015

(54) PNEUMATIC TIRE HAVING FIRST AND SECOND TURNUP PADS

(75) Inventors: Gayathri Venkataramani, Copley, OH (US); Dale Eugene Wells, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 666 days.

(21) Appl. No.: 12/886,879

(22) Filed: Sep. 21, 2010

(65) Prior Publication Data

US 2012/0067493 A1 Mar. 22, 2012

(51) Int. Cl.
*B60C 15/06* (2006.01)
*B60C 15/00* (2006.01)
*B60C 15/04* (2006.01)

(52) U.S. Cl.
CPC ............ *B60C 15/06* (2013.01); *B60C 15/0009* (2013.04); *B60C 15/04* (2013.01); *B60C 15/0603* (2013.04); *B60C 15/0607* (2013.04); *B60C 2015/061* (2013.04); *B60C 2015/0614* (2013.04); *B60C 2015/0621* (2013.04); *B60C 2200/065* (2013.04)

(58) Field of Classification Search
CPC  B60C 15/0009; B60C 15/0054; B60C 15/04; B60C 15/0603; B60C 15/0607; B60C 2015/061; B60C 2015/0617; B60C 2015/0621; B60C 2015/0614
USPC .......... 152/540, 541, 543, 546, 547, 552, 554
See application file for complete search history.

(56) References Cited

U.S. PATENT DOCUMENTS

| 3,018,821 | A |   | 1/1962 | Willis |
|---|---|---|---|---|
| 3,964,533 | A | * | 6/1976 | Arimura et al. ............... 152/541 |
| 4,842,033 | A | * | 6/1989 | Nguyen ......................... 152/541 |
| 4,953,605 | A | * | 9/1990 | Kawamura et al. ........... 152/541 |
| 5,131,447 | A | * | 7/1992 | Nakagawa et al. ........... 152/543 |
| 5,196,077 | A | * | 3/1993 | Kaga ............................. 152/541 |
| 5,429,168 | A | * | 7/1995 | Lobb et al. ............... 152/540 X |
| 5,659,148 | A |   | 8/1997 | Isgen |
| 5,743,976 | A |   | 4/1998 | Pena et al. |

(Continued)

FOREIGN PATENT DOCUMENTS

| JP | 9-99715 A | 4/1997 |
|---|---|---|
| JP | 10-76822 A | 3/1998 |
| JP | 2000168319 A | 6/2000 |

(Continued)

*Primary Examiner* — Adrienne C Johnstone
(74) *Attorney, Agent, or Firm* — June E. Rickey

(57) ABSTRACT

A pneumatic tire construction is described suitable for severe loading conditions. The tire includes a bead portion further having an apex which extends radially outward of the bead core, and a first turn-up pad located adjacent said chafer, and a second turn-up pad located adjacent said first turn-up pad, wherein the first turn-up pad has a G' less than the G' of the second turn-up pad. Alternatively, the first turn-up pad may be located adjacent to the rim flange and the second turn-up pad may be located axially inward of the first pad. The second turn-up pad is preferably thicker and longer than the first turn-up pad.

11 Claims, 9 Drawing Sheets

(56) References Cited

U.S. PATENT DOCUMENTS

| | | |
|---|---|---|
| 6,135,182 A | 10/2000 | Nagai et al. |
| 6,269,857 B1 | 8/2001 | Kanai et al. |
| 6,499,523 B1 | 12/2002 | Giraud |
| 6,523,591 B1 | 2/2003 | Billieres et al. |
| 6,659,148 B1 | 12/2003 | Alie et al. |
| 7,461,679 B2 * | 12/2008 | Maruoka ................. 152/541 X |
| 2010/0147434 A1 | 6/2010 | Ueyoko et al. |
| 2011/0114239 A1 * | 5/2011 | Venkataramani et al. |

FOREIGN PATENT DOCUMENTS

| | | |
|---|---|---|
| JP | 2003127620 A | 5/2003 |
| JP | 2004182164 A | 7/2004 |
| JP | 2006213163 A | 8/2006 |
| JP | 2009101920 A | 5/2009 |

* cited by examiner

Baseline

PNEUMATIC TIRE HAVING FIRST AND SECOND TURNUP PADS

TECHNICAL FIELD

This invention relates to heavy duty pneumatic tires such as are commonly used on earthmoving equipment, aircraft, and agricultural tires.

BACKGROUND

The invention concerns the reduction of rim chafing in large, heavy load tires or Off-The-Road tires of radial construction that are used in heavily loaded vehicles. The lower sidewall of a typical radial OTR construction consists of a ply around the bead and chipper reinforcements that restrict the circumferential deformation of the ply. Under heavy load, the lower sidewall of the tire bends over the rim flange, and the ply reinforcement rotates in the circumferential direction. The severe deformation results in high ply cord compression in the turnup near the rim flange region, and high in-plane shear strains in the turn-up pad. The deformation also results in rubbing of the chafer against the rim flange, resulting in wear of both the tire and rim. Chafing can be minimized by using reinforcements in the lower sidewall, but this reduction is not very significant. Thus it is desired to have an improved tire design to reduce the chafing of the tire against the rim.

DISCLOSURE OF THE INVENTION

Definitions

"Aspect ratio" of the tire means the ratio of its section height (SH) to its section width (SW);

"Axial" and "axially" mean lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Bias Ply Tire" means that the reinforcing cords in the carcass ply extend diagonally across the tire from bead-to-bead at about a 25-50° angle with respect to the equatorial plane of the tire, the ply cords running at opposite angles in alternate layers;

"Carcass" means the tire structure apart from the belt structure, tread, under tread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" means a reinforcement structure located in the bead portion of the tire;

"Cord" means one of the reinforcement strands of which the plies in the tire are comprised;

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial plane (EP)" means the plane perpendicular to the tire's axis of rotation and passing through the center of its tread;

"Innerliner" means the layer or layers of elastomer or other material that form the inside surface of a tubeless tire and that contain the inflating fluid within the tire;

"Normal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" mean directions radially toward or away from the axis of rotation of the tire;

"Radial-ply tire" means belted or circumferentially-restricted pneumatic tire in which the ply cords which extend from the bead to bead are laid at cord angles between 65 degrees and 90 degrees with respect to the equatorial plane of the tire;

"Section height" (SH) means the radial distance from the nominal rim diameter to the outer diameter of the tire at its equatorial plane; and, "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Turn-up pad" means a strip of elastomer located between the chafer and the turn-up end of the ply in the lower sidewall of the tire near the bead general area.

SUMMARY OF THE INVENTION

The invention provides in a first aspect a pneumatic tire having a carcass, the carcass having one or more cord reinforced plies and a pair of bead portions. Each bead portion has at least one annular inextensible bead core about which the cord reinforced plies are wrapped. A tread and a belt reinforcing structure is disposed radially outward of the carcass. The bead portion further includes an apex which extends radially outward of the bead core, and a chafer. The tire further has a first turn-up pad located adjacent said chafer, and a second turn-up pad located between the plies and the first turn-up pad, wherein the first turn-up pad has a G' less than the G' of the second turn-up pad.

BRIEF DESCRIPTION OF DRAWINGS

The invention may take physical form and certain parts and arrangements of parts, several preferred embodiments of which will be described in detail in this specification and illustrated in the accompanying drawings which form a part whereof and wherein.

DETAILED DESCRIPTION OF THE INVENTION

Figure 1:
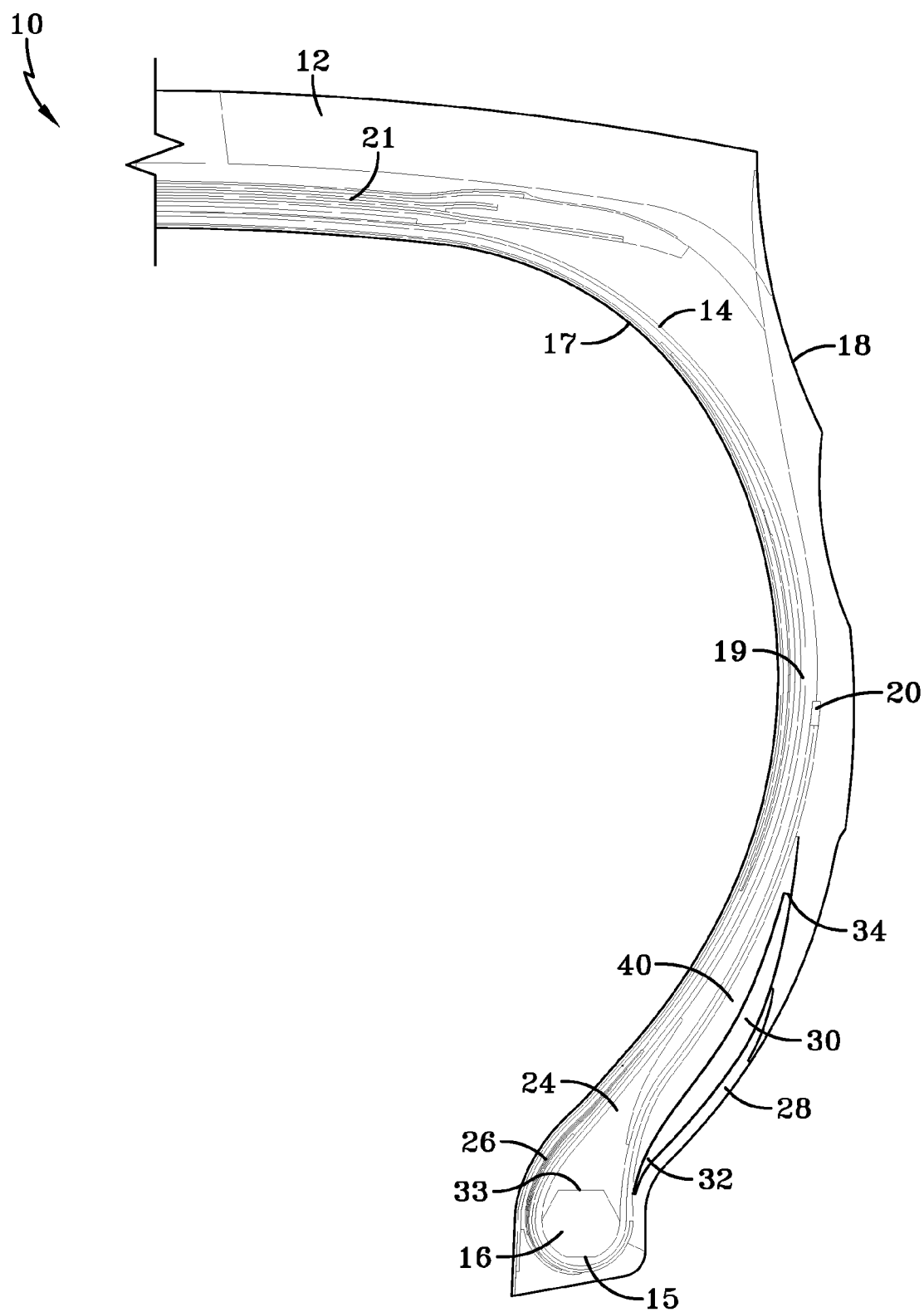
FIG. 1 is a cross-sectional view illustrating one side or one-half of a symmetrical heavy duty tire according to a first embodiment of the invention.
Figure 2:
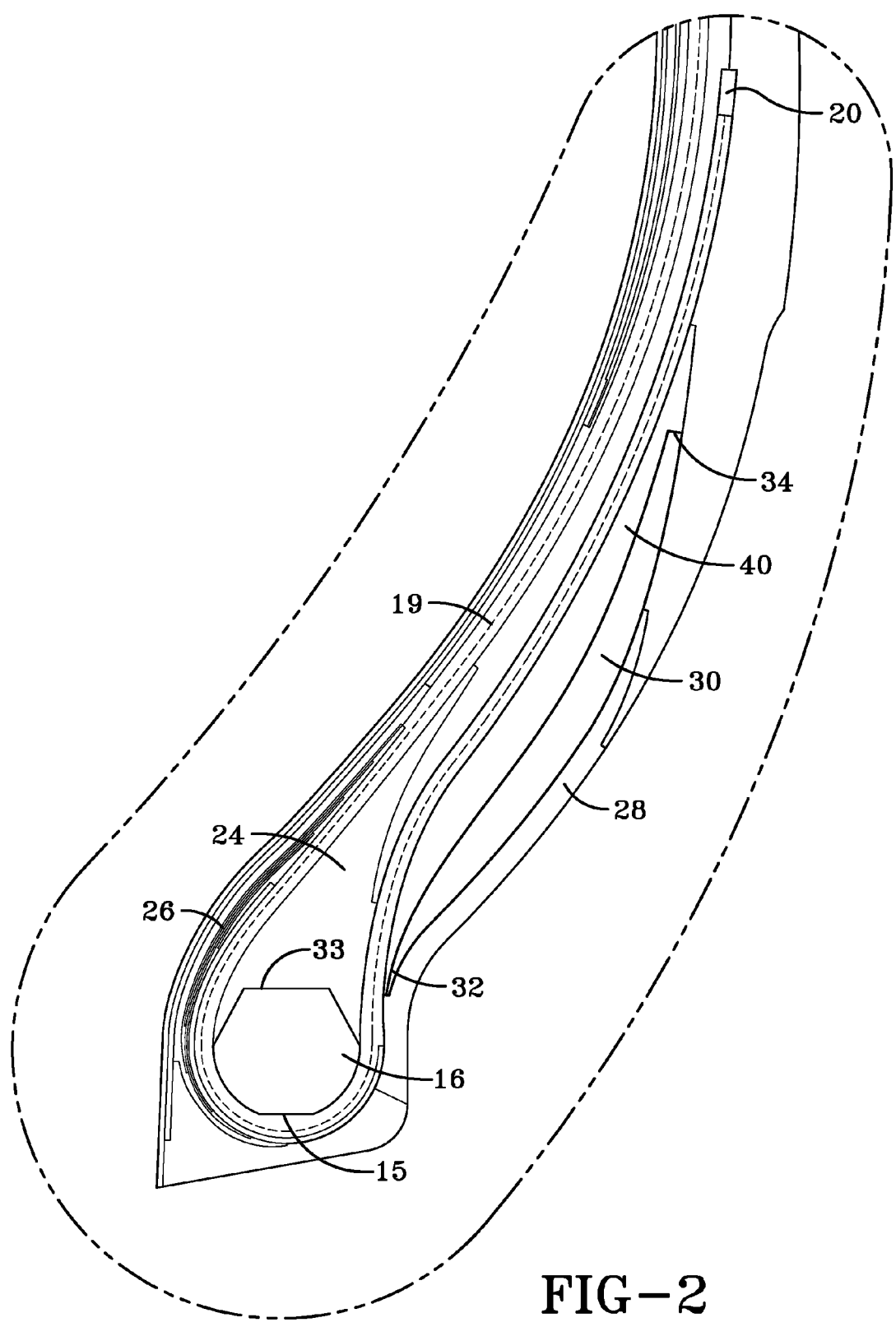
FIG. 2 is an enlarged cross-sectional view of the bead portion of the tire shown in FIG. 1.

With reference to FIGS. 1 and 2, a cross-sectional view of one half of a tire of the present invention 10 is illustrated. The tire 10 has a carcass 14 which includes a crown region having a radially outer tread 12 disposed over the crown region of the carcass 14. The outer surface of the tread may further include a plurality of lands and grooves or a plurality of tread blocks and grooves, as commonly known to those skilled in the art. The carcass further includes an optional inner liner 17 that covers the entire interior facing surface of the tire carcass and serves to hold the air or gas mixture that is used to inflate the tire. The inner liner of the tire is typically made of butyl rubber. The carcass 14 further includes a pair of tire sidewalls 18 which extend radially inward from the outer radial surface of the of the tire carcass, terminating in the vicinity of a pair of inextensible annular tensile members or beads 16.

The annular beads 16 illustrate an asymmetrical cross sectional shape having a lower half with a rounded outer surface 15 and an upper half portion 33 with angular outer edges similar to half of a hexagon. The annular beads may comprise other shapes such as, for example, round, hexagonal or a combination of shapes. Preferably, the radially innermost surface 15 of the bead wire is rounded.

The carcass further includes one or more steel cord reinforced plies 19 wrapped about each bead 16 forming a turnup portion 20, more preferably an envelope turnup. The portion of the ply which extends from the crown towards the bead and is axially inwards of the bead is referred to as the down portion of the ply or down ply, while the portion of the ply which extends radially and axially outwards from the bead is referred to as the up ply or turnup portion. The one or more plies 19 are oriented in the radial direction. Disposed radially outwardly of the ply 19 in the crown area of the tire is a steel reinforced belt package 21 formed of two or more belts. A pair of sidewalls 18 extend radially inward from the tread 12 to the bead area. Located radially outward of the bead 16 is an elastomeric apex 24. The apex as shown may have a triangular cross-sectional shape. Wrapped around the bead 16 is a flipper 26. The flipper 26 is located adjacent the bead 16 and the carcass ply 19. Located on the axially outer edge of the bead area is a chafer 28.

A first turn-up pad 30 is located adjacent the chafer 28 in the bead portion of the tire. The first turn-up pad 30 has a first end 32 located in the vicinity of the bead wire 16, and more preferably in line with the radially outer surface 33 of the bead wire. The first turn-up pad 30 has a second end 34 located between the first end 32 and the ply turnup 20. The length of the first turn-up pad 30 is sized so that it is positioned over the 90 degree bend of the rim when the tire is under load. The first turn-up pad 30 has a thickness in the range of about 0.4 to about 1.6 inches, and more preferably in the range of about 0.8 to about 1.2 inches. The thickness of the turn-up pad 30 is measured across the cross section of the pad, perpendicular to the pad longitudinal axis. The length of the first turn-up pad 30 may range from about 200 mm to about 400 mm. The first turn-up pad 30 is comprised of an elastomeric or rubber material having a G' which ranges from about 0.25 MPA to about 0.6 MPA, and more particularly in the range of about 0.35 MPA to about 0.5 MPA, and more particularly about 0.35 to about 0.47 MPA. The first turn-up pad 30 is made of a material having a G" which ranges from about 0.05 MPA to about 0.8 MPA, and more particularly about 0.05 MPA to about 0.07 MPA.

Unless otherwise noted, all G' values are measured on a rubber sample at a sample temperature of 90 deg C, at a measurement frequency of 10 Hz and at a strain amplitude of 50%. The rubber sample is taken from a cured tire manufactured to the desired manufacturer specifications. For the purposes of this invention, the storage modulus property G' is a viscoelastic property of a rubber composition and may be determined by a dynamic mechanical analyzer over a range of frequencies, temperature and strain amplitude. One example of a dynamic mechanical analyzer (DMA) suitable for measuring G', G" is model number DMA+450 sold by the 01-dB Metravib company. The DMA instrument uses dynamic mechanical analysis to evaluate rubber compositions. A cured sample of the respective rubber composition is subjected to a precisely controlled dynamic excitation (frequency and amplitude) at a frequency (Hertz) and temperature (° C.) and the sample stress response is observed by the instrument. The observed sample response can be separated, by the instrument, into viscous or loss modulus (G") and elastic or storage modulus (G') components. Unless otherwise indicated, all G" are measured at the same conditions as G'.

A second turn-up pad 40 is located adjacent said first turn-up pad 30, and is preferably located between the first turn-up pad 30 and the ply 19. The second turn-up pad 40 has a thickness in the range of about 0.4 to about 2.0 inches, and more preferably in the range of about 0.8 to about 1.8 inch. The length of the second turn-up pad 40 may range from about 200 mm to about 500 mm. The second turn-up pad 40 is comprised of an elastomeric or rubber material having a storage modulus G' which ranges from about 0.05 MPA to about 2.0 MPA and more preferably in the range of 0.6 to 1.5 MPA and more preferably in the range of 0.8 to 1.2 MPA. The turn-up pad 30 is made of a material having a G" which ranges from about 0.05 MPA to about 0.1 MPA. Thus it is desired that the first turn-up pad 30 be about 40% to about 60% softer than the second turn-up pad 40. Thus it is desired that the first turn-up pad 30 have a G' about 40% to about 60% less than the G' of the second turn-up pad 40, more preferably about 45% to about 55% less, and most preferably about 50% less.

Figure 3:
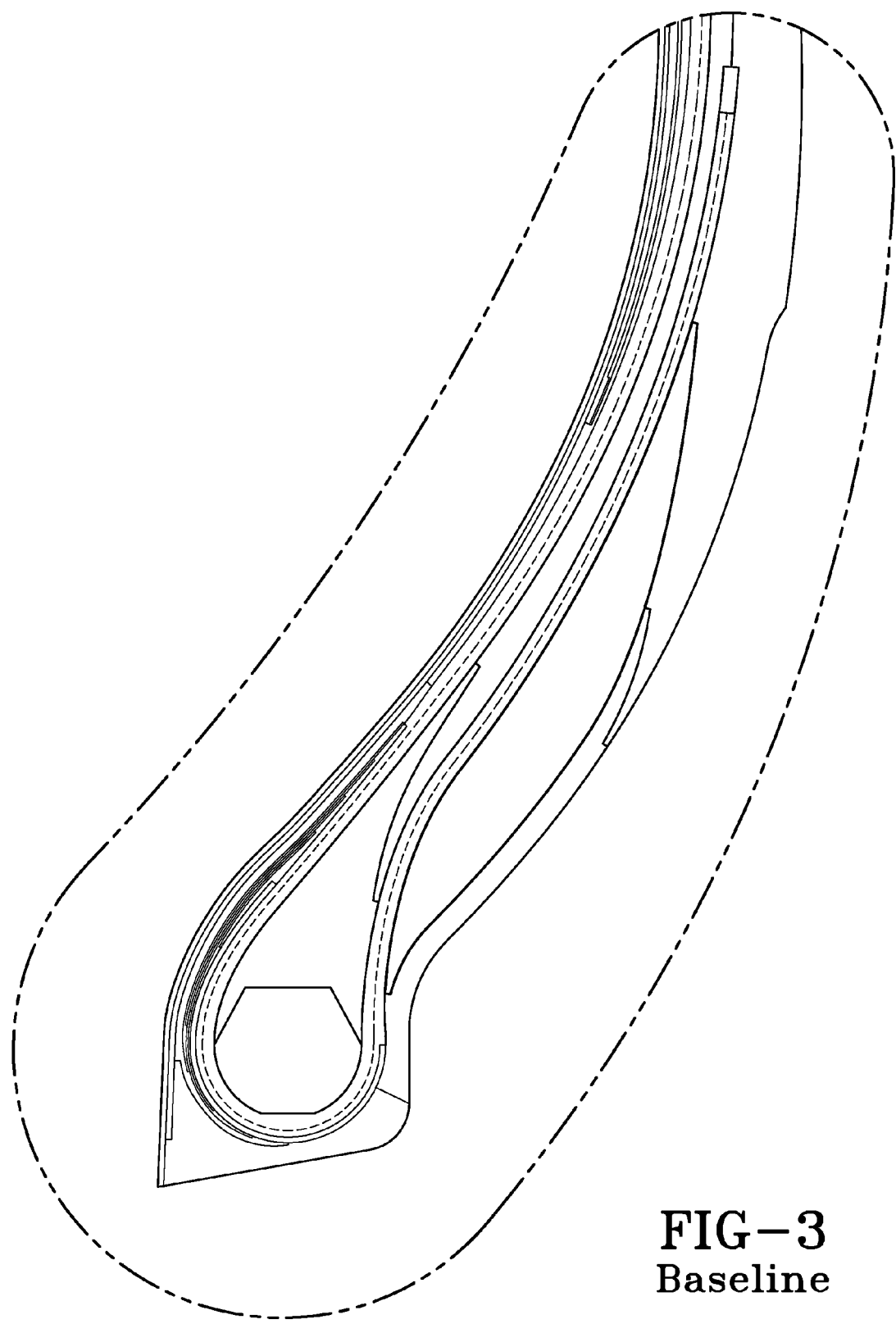
FIG. 3 is an enlarged cross-sectional view illustrating the bead portion of a baseline tire.
Figure 5:
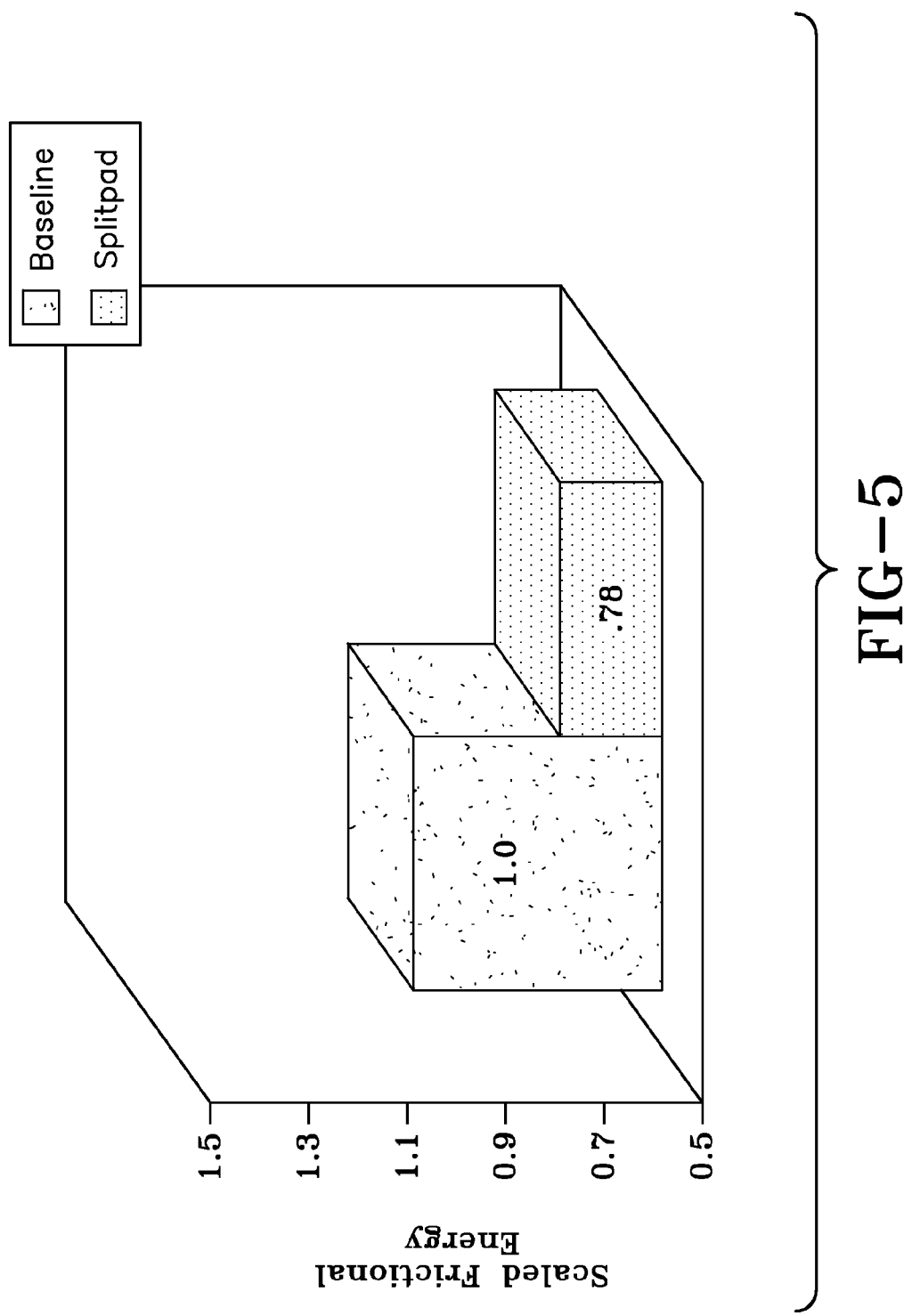
FIG. 5 illustrates a plot of Frictional Energy for the baseline tire and the tire having the split pad design.

As shown in FIG. 2, the length and thickness of the first turn-up pad 30 is about the same or slightly smaller than the second turn-up pad 40. A reduction in the stiffness of rubber of the first turn-up pad 30 minimizes the tangential traction between the chafer 28 and rim thereby significantly reducing rim chafing. Finite element analysis of the invention has shown significant reduction in rim chafing. FIG. 5 illustrates the calculated accumulated frictional energy levels of the baseline turn-up pad of FIG. 3 versus the accumulated frictional energy level of the split pad of FIG. 2. The baseline turn-up pad has a G' similar to that of second turn-up pad 40 and a thickness of 0.79 inches at a radius of 4 inches from the bead center, and a thickness of 1.76 inches at a radius of 8 inches from the bead center. With the split pad embodiment, rim chafing between chafer and rim is reduced by 18-22%.

Figure 4:
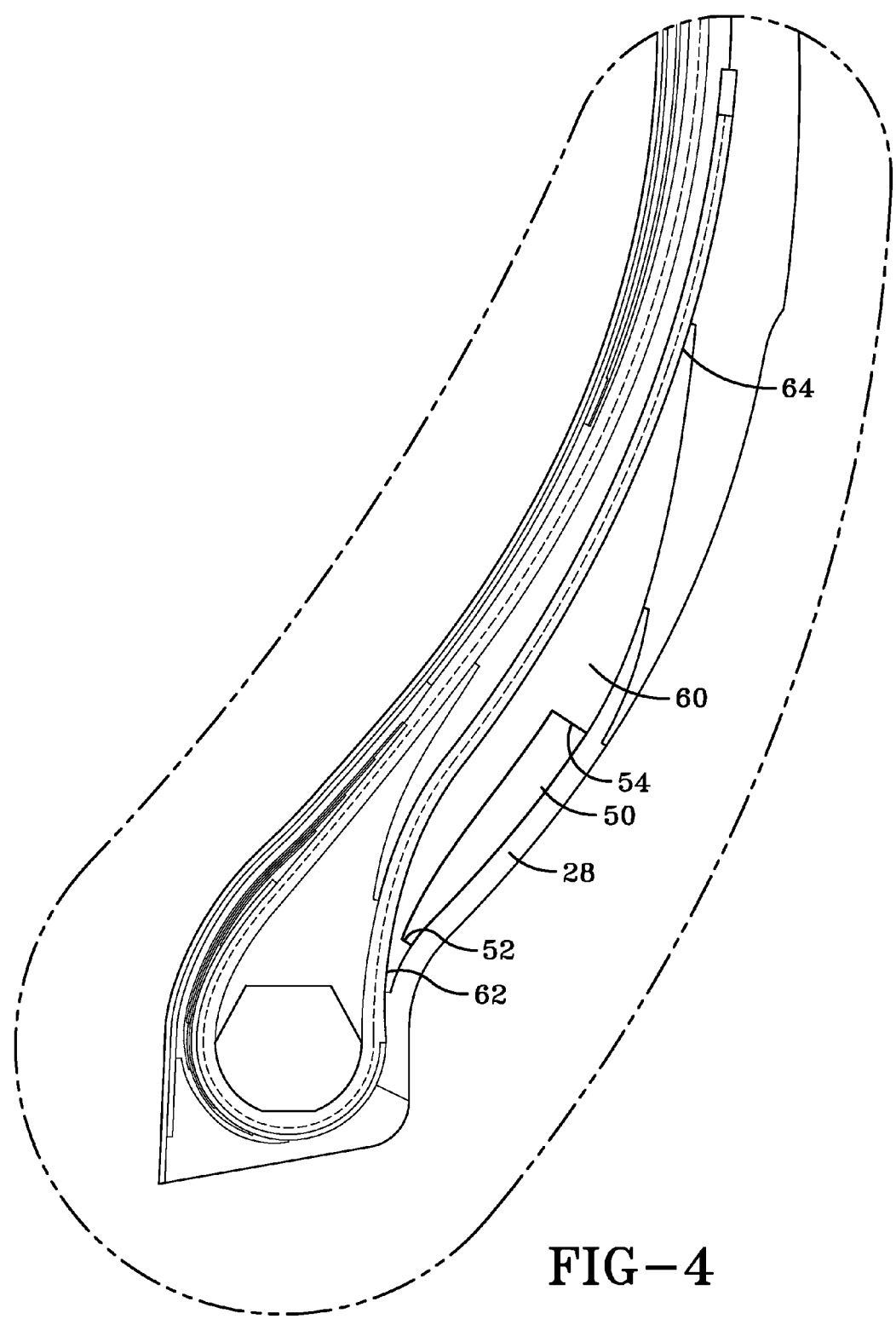
FIG. 4 is an enlarged cross-sectional view of a second embodiment of a bead portion of the tire of FIG. 1.

FIG. 4 illustrates a second embodiment of the invention wherein the first turn-up pad 50 has a modified geometry. The first turn-up pad 50 is located in the region where the sidewall contacts the rim flange at a radius R, wherein R ranges from 5 to about 8 inches and has a minimum thickness in the range of about 0.8 to 1.2 inches. The first end 52 of the first turn-up pad 50 is located radially outward of the bead, and has a second end 54 that is located radially inward of the outer tip of the apex. The first turn-up pad 50 is comprised of an elastomeric or rubber material having a G' which ranges from about 0.25 MPA to about 0.6 MPA, and more particularly in the range of about 0.35 MPA to about 0.47 MPA, and more particularly about 0.4 to about 0.45 MPA. The first turn-up pad 30 is made of a material having a G" which ranges from about 0.05 MPA to about 0.08 MPA.

As shown in FIG. 4, the second turn-up pad 60 has a maximum thickness of about 1.5 to 2 times as thick as the first turn-up pad 50. The second turn-up pad 60 has a first end 62 located about at the annular bead, and a second end 64 which extends radially outward of the apex tip and the second end 54 of the first turn-up pad 50. The length of the second turn-up pad is about 1.5 to 3 times the length of the first turn-up pad. The second turn-up pad 60 is comprised of an elastomeric or rubber material having a storage modulus G' which ranges from about 0.5 MPA to about 2.0 MPA and more preferably in the range of 0.6 to 1.5 MPA and more preferably in the range of 0.8 to 1.2 MPA. The turn-up pad 30 is made of a material having a G" which ranges from about 0.05 MPA to about 0.1 MPA.

Figure 6:
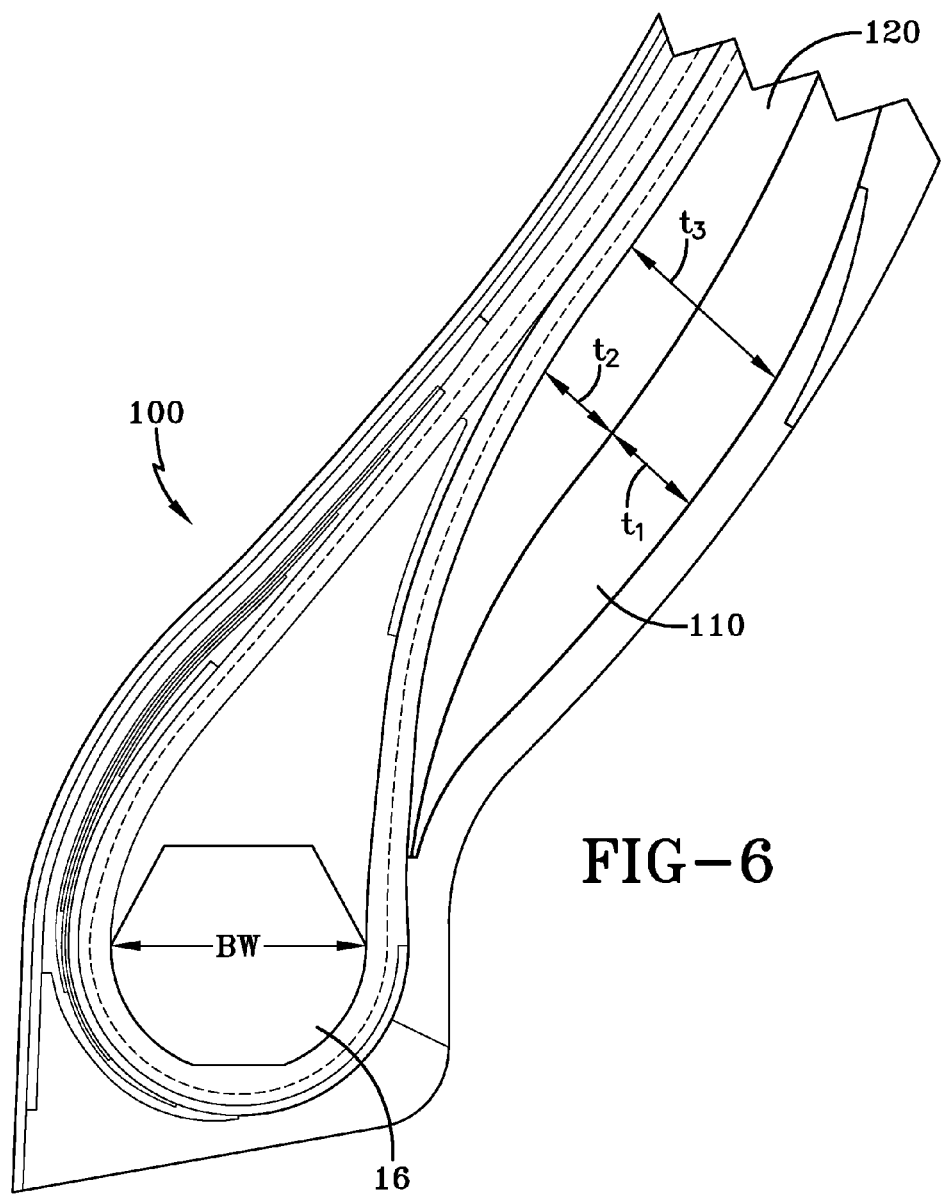
FIG. 6 is an enlarged cross-sectional view of a third embodiment of a lower sidewall portion of a tire.

FIG. 6 illustrates yet another alternate embodiment of a tire 100 of the present invention illustrating only the bead and lower sidewall area. The remaining areas of the tire are as described in more detail, above. When there is a durability issue in the lower sidewall, tire designers have historically increased the bead diameter in order to reduce the stress/strain in the lower sidewall. An increase in bead width increases the compressive force in the ply cord while achieving only moderate decrease in the stress/strain in the lower sidewall. The inventor has found that a combination of reduction in bead width and increase in turn-up pad thickness yields the most desirable results that are not intuitive. It is desirable to reduce the bead width Bw of the annular tensile member 16 to the range of about 2.0 to 3 inches, more particularly in the range of about 2.4 to 2.65 inches, and more preferably about 2.4 to 2.5 inches.

Figure 7:
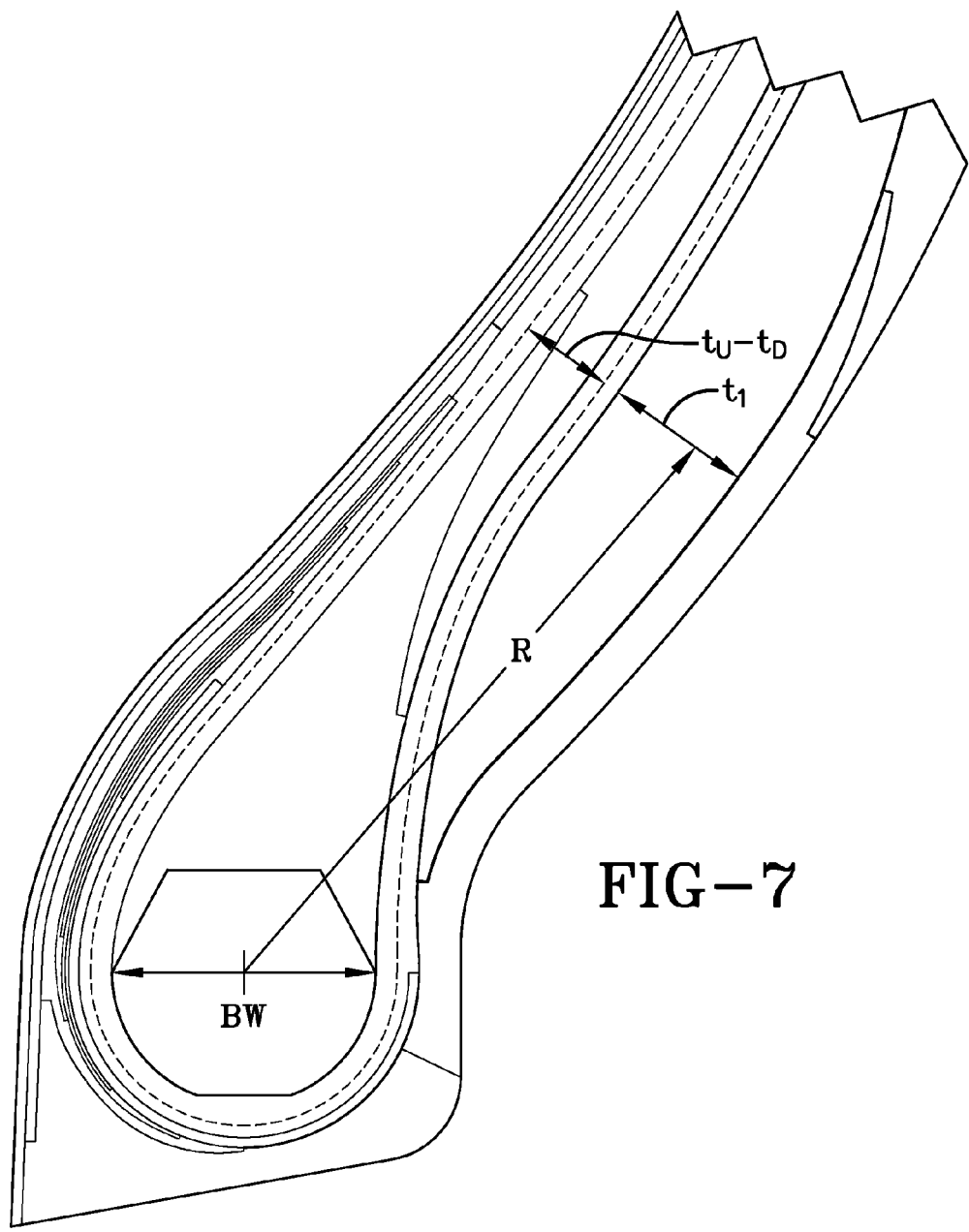
FIG. 7 illustrates an enlarged cross-sectional view of a lower sidewall portion of a tire illustrating how the turnup ply-turndown ply gauge, the turn-up pad gauge and the bead width are measured.

It has also been determined that by reducing the gauge or distance between the ply turnup and the ply turndown (hereinafter "turnup-turndown gauge") as shown in FIG. 7, that the ply cord compression is reduced. The inventor has found that the effect of decreasing the gauge between ply turnup and ply turndown on the ply cord compression is more pronounced as the turn-up pad gauge increases. The distance or gauge is measured perpendicular to the longitudinal axis of the ply. It is thus desired to have the turnup-turndown gauge to be in the range of about 0.25 in to about 0.8 in, and more particularly in the range of about 0.4 inch to about 0.6 inches, and most preferably about 0.4 to about 0.5 inches. The turnup-turndown gauge is measured over a range of radius R from the center of annular tensile member to the intersection with the turnup longitudinal axis. It is additionally preferred that the turnup-turndown gauge previously stated occur at a radius of 8 inches from the bead center. At a radius of 4 inches from the bead center, it is desired to have the turnup-turndown gauge to be in the range of about 1.25 in to about 1.75 in, and more particularly in the range of about 1.4 inch to about 1.7 inches, and most preferably about 1.5 to about 1.6 inches.

FIG. 6 further illustrates a first turn-up pad 110 and a second turn-up pad 120. The first turn-up pad 110 has a minimum thickness T1 in the range of about 0.5 inches to about 1.7 inches, and more preferably in the range of about 0.6 inches to about 1.2 inches. The thickness is measured at a defined radius from the bead center, and is determined perpendicular to the longitudinal axis of the ply reinforcement. The minimum thickness of the first turn-up pad is determined over a range of radius R as measured from the center of the annular tensile member. The Radius R ranges from about 4 to about 8 inches. The length of the first turn-up pad 110 may range from about 200 mm to about 400 mm. The first turn-up pad 110 has a maximum thickness in the range of about 1.3 inches to about 3 inches, and more preferably in the range of about 1.3 inches to about 2 inches, preferably at a Radius R of 8 inches.

The second turn-up pad 120 is located between the first turn-up pad and the ply turnup, and is preferably located between the first turn-up pad 110 and the ply 19. The second turn-up pad 120 has a minimum thickness in the range of about 0.5 inches to about 1.7 inches, and more preferably in the range of about 0.5 inches to about 1.2 inches. The second turn-up pad 120 has a maximum thickness in the range of about 1.3 inches to about 3 inches, and more preferably in the range of about 1.3 inches to about 2 inches. The thickness of the second turn-up pad is determined at a first radius R measured from the center of the annular tensile member. The maximum thickness preferably occurs over the range in radius R of about 6 to 8 inches from the bead center, and the minimum thickness preferably occurs over the range in radius R of about 4-6 inches. The length of the second turn-up pad 120 may range from about 200 mm to about 500 mm.

The first turn-up pad 110 is comprised of an elastomeric or rubber material having a G' which ranges from about 0.25 MPA to about 0.6 MPA, and more particularly in the range of about 0.35 MPA to about 0.47 MPA, and more particularly about 0.4 to about 0.45 MPA. The first turn-up pad 110 is made of a material having a G" which ranges from about 0.05 MPA to about 0.08 MPA.

The second turn-up pad 120 is comprised of an elastomeric or rubber material having a storage modulus G' which ranges from about 0.5 MPA to about 2.0 MPA and more preferably in the range of 0.6 to 1.5 MPA and more preferably in the range of 0.8 to 1.2 MPA. The turn-up pad 120 is made of a material having a G" which ranges from about 0.05 MPA to about 0.1 MPA.

Figure 8:
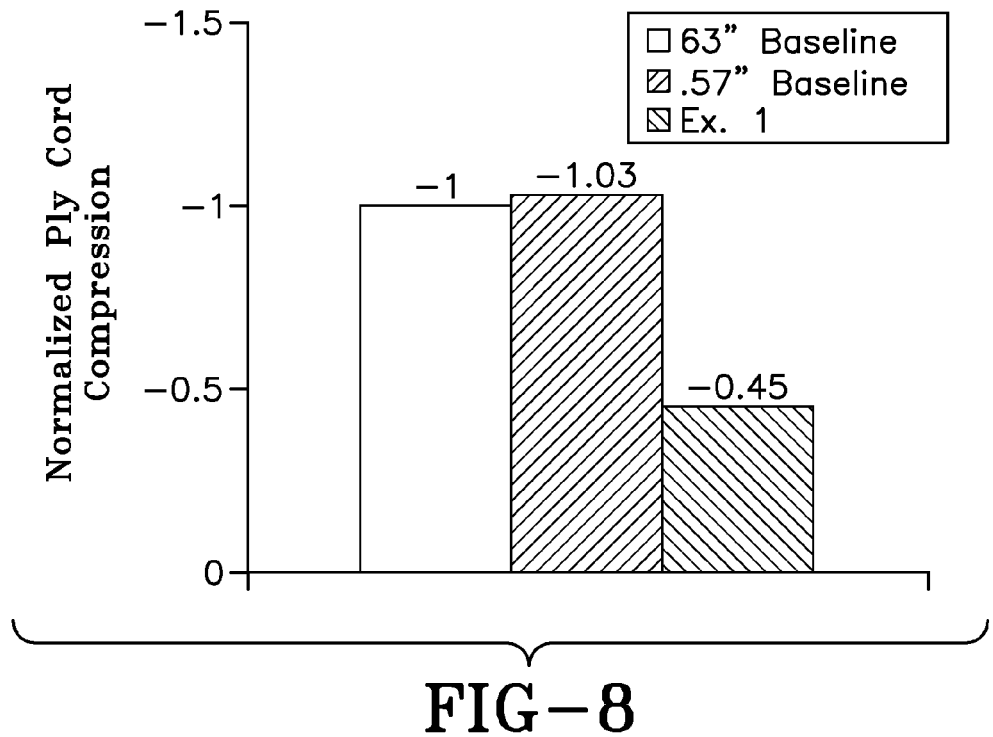
FIG. 8 illustrates a graph of ply cord compression for the tire of Ex. 1 versus the base line tire.
Figure 9:
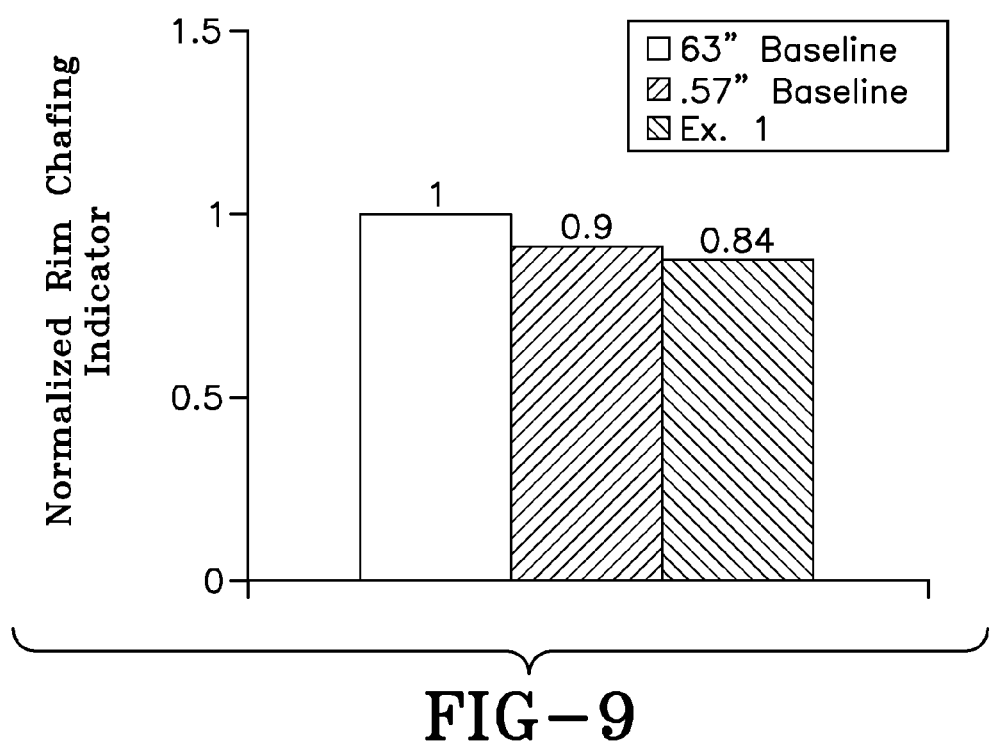
FIG. 9 illustrates a graph of rim chafing indicator for the tire of Ex. 1 versus the base line tire.
Figure 10:
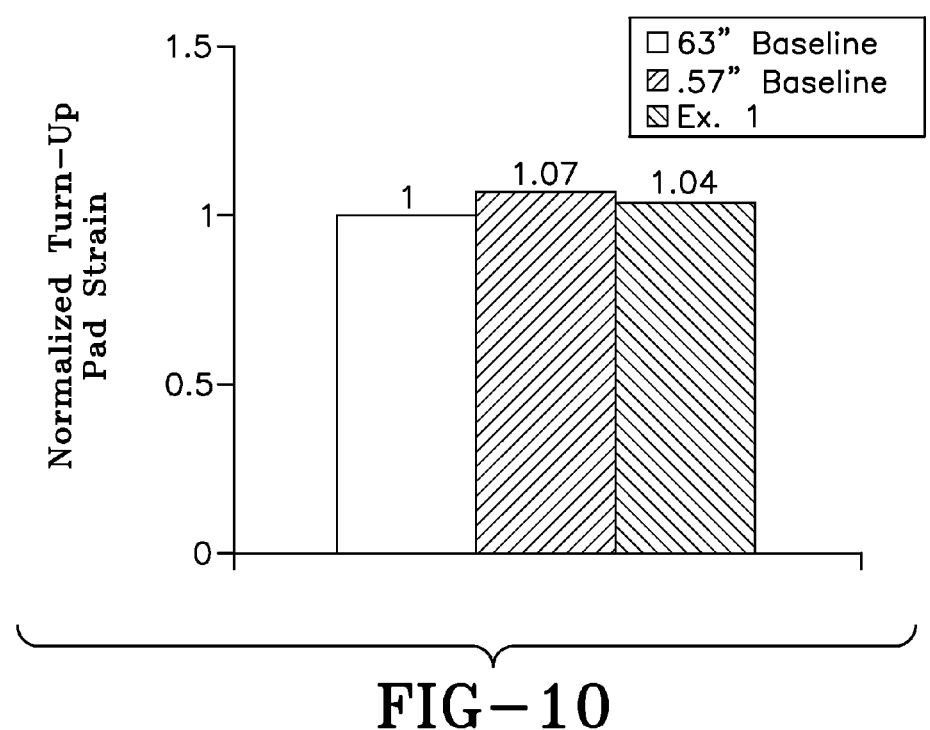
FIG. 10 illustrates a graph of turn-up pad strain for the tire of Ex. 1 versus the base line tire.

FIGS. 8 through 10 illustrate the results from numerical simulation study of a tire of the invention in a 57 inch size and a 63 inch size as compared to a baseline design in a 57 inch and 63 inch size. The baseline design had a bead width of 3.15 inch and a turnup-turndown gauge of 1.13 inches at a radius of 8 inches from the bead center. The baseline tire had a turn-up pad gauge of 1.75 inches as measured at a radius of 8 inches from the bead center. The Ex. 1 tire had an annular tensile member having a width of 2.65 inch, and a turn-up pad thickness of 2.52 inches. The pad was evenly divided into two materials as shown in FIG. 6, wherein the G' of the axially outer turn-up pad 110 was 0.4 to 1.2 MPA and the G' of the axially inner turn-up pad was 0.8 to 2.8 MPA. The thickness of each turn-up pad was 0.5 inches to about 1.3 inches at a radius of 4 inches to 8 inches from the bead center. The Ex. 1 tire had a bead width of 2.65 inches, a ply turnup ply-turndown gauge of 0.45 inches at a radius of 8 inches from the bead center.

FIG. 8 illustrates a significant 55% reduction of ply cord compression for the inventive tire of Ex. 1 as compared to the baseline design. FIG. 9 illustrates a reduction of 16% in the rim chafing indicator for the tire of Ex. 1 as compared to the baseline tire. FIG. 10 illustrates that the strain in the turn-up pad is about the same for the base line design and the tire of Ex. 1.

What is claimed is:

1. A pneumatic tire comprising a carcass, the carcass having one or more cord reinforced plies and a pair of bead portions, each bead portion having at least one annular inextensible bead core about which the cord reinforced plies are wrapped, a tread, a pair of sidewalls, each sidewall extending radially inward from the tread to one of the pair of bead portions, and a belt reinforcing structure disposed radially outward of the carcass, each bead portion further comprising an apex which extends radially outward of the at least one bead core, and a chafer, said one or more cord reinforced carcass plies having a turndown portion which extends from the crown and axially inward of the at least one bead core in each bead portion and a turn up portion in each bead portion which extends radially outward from the at least one bead core and axially outward of the at least one bead core, the tire further comprising in each bead portion a first turn-up pad located adjacent said chafer, and a second turn-up pad located between the turnups of the one or more cord reinforced carcass plies and said first turn-up pad, wherein the first turn-up pad has a G' less than the G' of the second turn-up pad, wherein at a radius of 4 inches measured from the center of the bead core to the intersection with the turnup longitudinal axis, the longitudinal axes of said turnup and turndown portions are parallel, and wherein the gauge between the turnup portion of the ply and the turndown portion of the ply measured perpendicular to the longitudinal axes is in the range of 1.25 inch to 1.75 inches.

2. The tire of claim 1 wherein the G' of the first turn-up pad is in the range of 20% to 60% less than the G' of the second turn-up pad.

3. The tire of claim 1 wherein the G' of the first turn-up pad is in the range of 30% to 55% less than the G' of the second turn-up pad.

4. The tire of claim 1 wherein the G' of the first turn-up pad is in the range of 40% to 55% less than the G' of the second turn-up pad.

5. The tire of claim 1 wherein the first turn-up pad has a radially outer end which is radially outward of said apex.

6. The tire of claim 1 wherein the second turn-up pad has a radially outer end which is radially outward of said apex.

7. The tire of claim 1 wherein the first turn-up pad has a radially outer end which is radially inward of a radially outer tip of said apex.

8. The tire of claim 1 wherein the bead core has a width less than 3.2 inches.

9. The tire of claim 1 wherein the bead core has a width in the range of 2.4 to 2.5 inches.

10. The tire of claim 1 wherein the bead core has a width in the range of 2.4 to 2.65 inches.

11. The tire of claim 1 wherein the bead core has a width in the range of 2 to 3 inches.

* * * * *